J. ASTROM.
VALVE.
APPLICATION FILED MAY 12, 1919.

1,349,253.

Patented Aug. 10, 1920.

Witness:
J. F. Britt

Inventor:
John Astrom
By Young & Young
Attorneys

UNITED STATES PATENT OFFICE.

JOHN ASTROM, OF FORT WAYNE, INDIANA, ASSIGNOR TO FORT WAYNE ENGINEERING & MANUFACTURING CO., OF FORT WAYNE, INDIANA.

VALVE.

1,349,253. Specification of Letters Patent. Patented Aug. 10, 1920.

Application filed May 12, 1919. Serial No. 296,459.

*To all whom it may concern:*

Be it known that I, JOHN ASTROM, a citizen of the United States, and resident of Fort Wayne, in the county of Allen and State of Indiana, have invented certain new and useful Improvements in Valves; and I do hereby declare that the following is a full, clear, and exact description thereof.

My invention relates to new and useful improvements in valves, and more particularly in the means for retaining the parts thereof in closed position.

In valves of standard design at present on the market, the construction is such that frequently the closing of the valve head is affected by the variable pressure exerted thereagainst by the closing spring. This is caused by the tendency of practically all expansile helical springs to exert a side pressure, even when their ends are both squared and ground. The valve head being forced sidewise against its guide causes considerable friction and renders the opening and closing difficult. Inasmuch as pressure on the valve head is thus unevenly distributed, the valve is liable to leak when the closing spring is of light compression.

It is therefore the principal object of the present invention to overcome these troubles by providing what may be called a "point contact" between the spring and the valve head whereby the pressure of the former is exerted centrally of the latter and in its direction of opening and closing movement.

It is further an object of this invention to provide a simply constructed and efficient means for adjustably varying the spring pressure exerted on the valve head.

A further object is to simplify and otherwise improve the construction and the manner of assembling the various parts of devices of this character.

Figure 1:
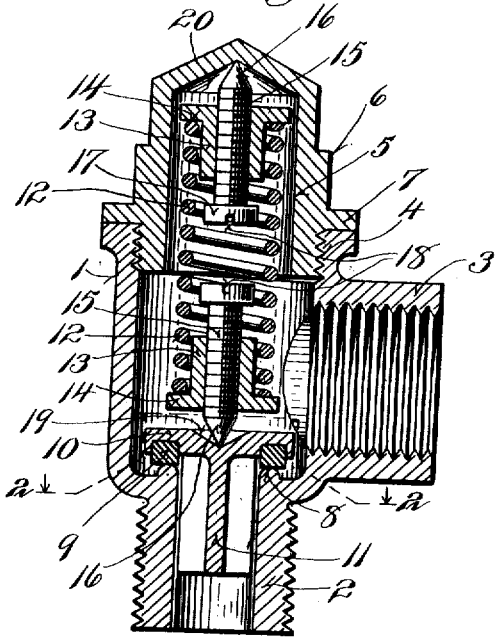
Figure 2:
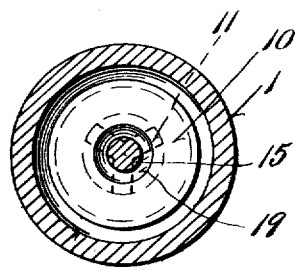

With these and other objects in view, the invention resides in the novel features of construction, combination and arrangement of parts which will be hereinafter more particularly described and claimed:

In the accompanying drawing:

Figure 1 represents a vertical longitudinal sectional view through a relief valve constructed in accordance with my invention, and Fig. 2 is a transverse section taken substantially on the plane of the line 2—2 of Fig. 1, Referring more particularly to said drawing, it will be seen that my method may be incorporated in a relief valve designed for any ordinary or usual work. My invention will also be found useful, however, in various other types of valves.

In the illustrated embodiment of the invention the numeral 1 denotes a substantially T-shaped valve casing which includes an inlet attaching nipple 2, and an outlet attaching nipple 3, preferably disposed at right angles to each other. The portion of the casing on the opposite side of the nipple 3 from the nipple 2 and alined with the latter, is internally screw-threaded as at 4 to receive a cap 5. The intermediate portion 6 of the cap is polygonal in cross section to permit the application of a wrench thereto to tightly engage a radial flange 7 with the adjacent end of the casing 1.

Surrounding the passageway of the inlet nipple 2 and within the casing 1 is a valve seat 8, with which a gasket 9 carried by a valve disk 10 engages. This disk has a ribbed valve stem 11 extending therefrom and slidably disposed in said inlet passageway, the inner wall of the nipple 2 thus forming a guide for the valve stem.

In standard relief valves this valve disk would open against the pressure of an expansile spring having one end bearing directly thereagainst, the other end being engaged with the valve cap or a suitable part of the casing. In my invention, however, the force of an expansile helical spring 12 is exerted on the valve disk in the exact center thereof and in the direction of its opening and closing movement. Any tendency of the valve disk to move sidewise owing to the uneven pressure of the spring is thus prevented.

This result is obtained by a pair of sleeves 13 of a diameter to slip within the ends of the spring 12, each of which has a radial flange 14 to be engaged by the outermost coils of the spring. Each of the sleeves is internally threaded and receives a threaded stem 15, the outer end of which has a conical point 16, while the inner end has a head 17 provided with a screw driver kerf 18.

It will be noted that the pointed ends 16 extend in opposite directions; one of these ends is disposed in a conical socket 19 formed in the center of the inner face of the valve disk 10, and the other is located in a similar socket 20 in the end of the cap 5. The apex of the socket 20 is centrally of the cap 5 and is thus alined with the apex of the other socket 19. In fact the parts are so arranged that the longitudinal axis of the passageway of the inlet nipple 2 will extend through the center of the valve disk 10 and the points of the ends 16. Thus even though the ends of the springs do not evenly engage the flanges 14, the force of said spring can only be applied directly to the center of the valve cap to thereby evenly seat the same.

Should it be necessary to adjust the tension of the spring 12 for various pressures on the valve disk, the cap 5 can be readily removed to permit the withdrawal of the uppermost flanged sleeve 13 and its stem 15, or if necessary the spring 12 and the other sleeve and stem. Either one or both of the stems may be then adjusted and their sleeves and parts reassembled as shown.

Various changes may be made in the form and proportion and in the details of construction of the valve without departing from or sacrificing any of the features as outlined in the following claims. For instance at times it might be necessary to only use one of the pointed stems, that is to say the innermost one, allowing the outer end of the spring to bear against the end of the cap or an appropriate part of the valve casing.

I claim:

1. A device of the class described comprising a valve casing, a valve seatable therein, an expansile spring for urging the valve to a seating position, and a stem adjustably carried by each end of the spring and projecting therebeyond, said stems being relatively alined, the projecting end of one stem being engaged with the valve centrally thereof and the corresponding end of the other stem engaged with the valve casing.

2. A device of the class described comprising a valve casing, a valve seatable therein, an expansile coil spring for urging the valve to a seating position, a flanged sleeve disposed in each end of the spring, the flanges thereof engaging the ends of said spring, and a stem adjustably disposed in each of said sleeves and projecting outwardly thereof, the projecting end of one of the stems engaging the valve centrally thereof and the corresponding end of the other stem engaging said valve casing.

3. A device of the class described comprising a valve casing, a valve seatable therein, an expansile coil spring for urging the valve to a seating position, an internally threaded flanged sleeve disposed in each end of the spring, the flange of each sleeve being engaged by the adjacent end of the spring, and a stem threadedly disposed in each of said sleeves and having one end projecting outwardly thereof, the projecting end of one of the stems engaging the valve centrally thereof and the corresponding end of the other stem engaging said valve casing.

4. A device of the class described comprising a valve casing, one end thereof having a concaved socket, a valve seatable in said casing and having a centrally concaved socket, the center of the socket of the casing being relatively alined with the center of the socket in the valve, an expansile spring for urging the valve to a seating position, and a pointed stem carried by each end of said spring, the points of said stems being extended in opposite directions for respective engagement with the said sockets whereby the expansile force of said spring will be applied in the center of the valve and in the direction of opening and closing movement thereof.

In testimony that I claim the foregoing I have hereunto set my hand at Fort Wayne, in the county of Allen and State of Indiana.

JOHN ASTROM.